July 7, 1959

L. L. GENUIT 2,894,195

FREQUENCY TRIPLER

Filed July 1, 1957

Inventor:
Luther L. Genuit,
by Robert G. Irish
His Attorney.

July 7, 1959  L. L. GENUIT  2,894,195
FREQUENCY TRIPLER
Filed July 1, 1957  6 Sheets-Sheet 3
Fig. 3.
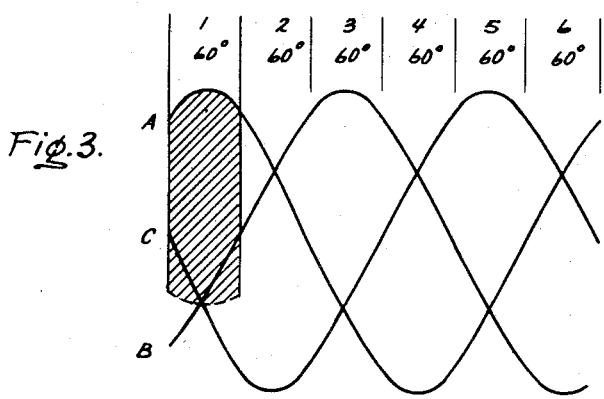
Fig. 4.
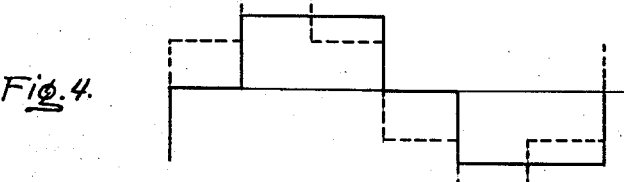
Fig. 5.
| OUTPUT REACTOR | 1 | 3 | 2 | 1 | 3 | 2 |
|---|---|---|---|---|---|---|
| OUTPUT VOLTAGE | A-CB | C-AB | B-AC | A-BC | C-BA | B-CA |
| CURRENT LIMIT REACTOR | 5,7,8 | 5,6,8 | 6,8,9 | 4,6,9 | 4,7,9 | 4,5,7 |
| LOAD CURRENT LIMIT REACTOR | 3 | 2 | 1 | 3 | 2 | 1 |
Fig. 6.
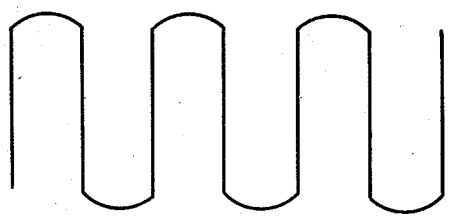
Fig. 7.
Inventor:
Luther L. Genuit,
by Robert G. Irish
His Attorney.

July 7, 1959

L. L. GENUIT 2,894,195

FREQUENCY TRIPLER

Filed July 1, 1957

Inventor:
Luther L. Genuit,
by
His Attorney.

July 7, 1959     L. L. GENUIT     2,894,195
FREQUENCY TRIPLER

Filed July 1, 1957     6 Sheets-Sheet 6

Inventor:
Luther L. Genuit,
by Robert G. Irish
His Attorney.

United States Patent Office 2,894,195
Patented July 7, 1959

2,894,195

FREQUENCY TRIPLER

Luther L. Genuit, Fort Wayne, Ind., assignor to General Electric Company, a corporation of New York Application July 1, 1957, Serial No. 669,096

4 Claims. (Cl. 321—7)

This invention relates to frequency multipliers and more particularly to static magnetic devices for converting three phase alternating current having a given frequency to single phase alternating current having a frequency three times the input frequency.

There are numerous instances where it has been found desirable to operate alternating current electrical apparatus from a power source having a frequency considerably higher than that commonly provided by utilities, i.e., 60 cycles in the United States. It has been found, for example, that operation of fluorescent lamps at higher frequencies permits the use of smaller and less expensive ballasts for each lamp, and that the lamps produce higher lumens per watt than when operated at 60 cycles. Other desirable fields of application lie in the operation of other electrical apparatus such as magnetic amplifiers and induction motors.

The increase in the frequency of the power supply has, in the past, conventionally been provided either by rotating equipment such as motor generator sets or in a few cases recently by static frequency multipliers. The rotating equipment inherently requires maintenance and thus has a major unavoidable defect. The frequency multipliers designed in the past have generally not provided the optimum wave shape which is particularly important in the case of fluorescent lamps, where the wave shape is highly material in the operating efficiency of the lamp. In addition, previous static frequency multipliers have not provided particularly good overall utilization of the electrical components of the equipment. Such utilization is measured by a rating factor which represents the sum of the volt-ampere ratings of the reactors in the system divided by the power output of the system. The volt-ampere rating of a reactor is equal to the sum of the volt-ampere ratings of all of its windings. For each winding the voltage rating is defined as the root-mean-square (M.R.S.) voltage at the given input frequency that the reactor winding, must be capable of supporting without saturating the core. The current rating of the winding is equal to the R.M.S. value of the current flowing in that winding under a full-load condition.

In the light of the desirability of obtaining higher frequency electric power for many purposes, and in view of the importance of the wave form and of obtaining a suitably low rating factor, it is desirable to provide an improved frequency multiplier which will achieve these desired ends.

It is, therefore, an object of this invention to provide an improved static frequency multiplier more particularly a tripler, for converting three phase alternating current having a given frequency into single phase alternating current having a frequency three times the given frequency.

A further object of the invention is to achieve this frequency increase through a construction which provides a symmetrical output wave form.

Yet another object of the invention is to achieve such a construction through the use of saturable core reactors which are so designed and connected as to provide a substantially lower rating factor than has heretofore been the case in static frequency triplers.

Further objects and advantages of the invention will become apparent by reference to the following description and the accompanying drawings, and the features of novelty which characterize this invention will be pointed out with particularity in the claims annexed to and forming a part of this specification.

In one aspect, the invention provides a static frequency multiplier for converting three phase alternating current having a predetermined frequency into single phase alternating current having a frequency three times the predetermined frequency. The multiplier includes three output saturable core reactors, each of which is provided with primary and secondary windings. The primary windings are Y-connected, and the secondary windings are connected in series with each other and are adapted to be connected across a load. The multiplier also includes six current limiting saturable core reactors each of which has one bias winding and two alternating current windings. This makes a total of twelve alternating current windings which are divided into three groups of four windings each, with each of the four windings of a group belonging to a different current limiting reactor. Each group has its four windings connected in two parallel pairs each having two serially connected windings. The three groups are respectively connected in series with the three primary windings so that each group is in a leg of the Y formed by the primary windings, and so that each current limiting reactor has its two alternating current windings in different legs of the Y.

Each of the bias windings is adapted to have a bias current passed through it, and each of the current limiting reactors is so wound that the bias current is aided by positive current in the first alternating current winding thereof and by negative current in the second alternating current winding thereof. By "positive" is meant current which flows toward the center of the Y, and by "negative" is meant current which flows away from the center of the Y. Each of the pairs of each of the groups includes the first alternating current winding from one current limiting reactor and the second alternating current winding from another current limiting reactor. Also, in the case of each pair of a group, the two current limiting reactors which have alternating current windings in that pair have their other alternating current windings in different groups respectively.

Fundamentally, the output saturable core reactors depend for their operation upon reversal of flux in the core of each reactor from saturation in one direction to saturation in the opposite direction in 60 degrees of a cycle of applied voltage; each such reversal induces a half cycle of alternating current output voltage in the output winding. Each interval of the six 60 degree intervals in a complete cycle of applied voltage thus produces a half cycle of output voltage in one output reactor element. The individual half cycles of output voltage are then sequentially combined to produce a single phase alternating current output voltage having three times the frequency of the three phase applied voltage.

In the drawings, Figure 1 is a schematic illustration of the improved frequency tripler of this invention;

Figure 3 is an illustration of the phase relationships of the voltage waves impressed upon the input terminals of the system of Figures 1 and 2;

Figure 4 shows the magnitude and polarity of the phase current flowing in the output reactor of phase A of Figure 1 during one complete cycle of impressed voltage;

Figure 5 is a chart showing the output reactors, the output voltage, the current limiting reactors, and the load limiting reactors which are effective during each 60 degree interval of impressed voltage in the system of Figure 1;

Figure 6 shows the output voltage wave with a unity power factor load drawing current within the limitations set by the circuit;

Figure 7 shows the current wave for the voltage wave of Figure 6;

Figure 1:
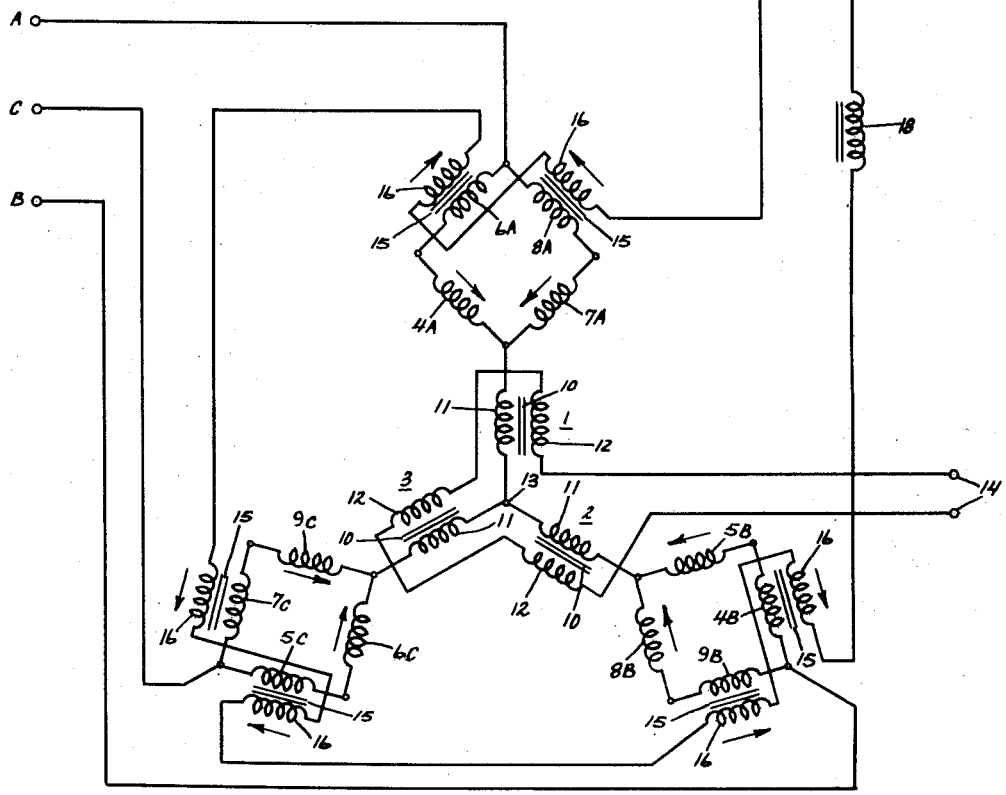
Figure 9:
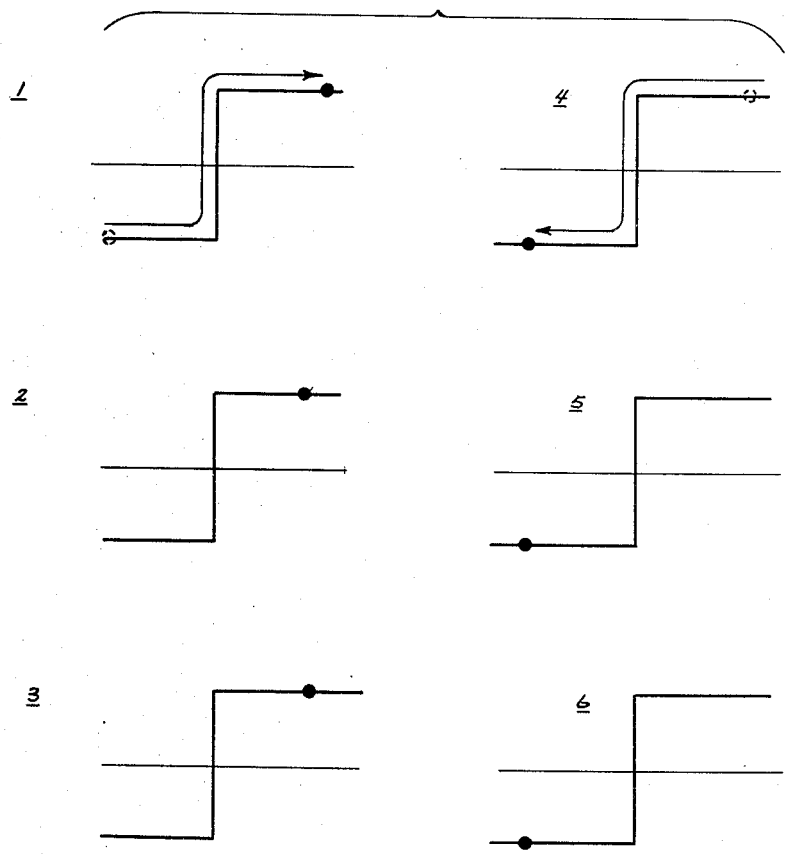
Figure 10:
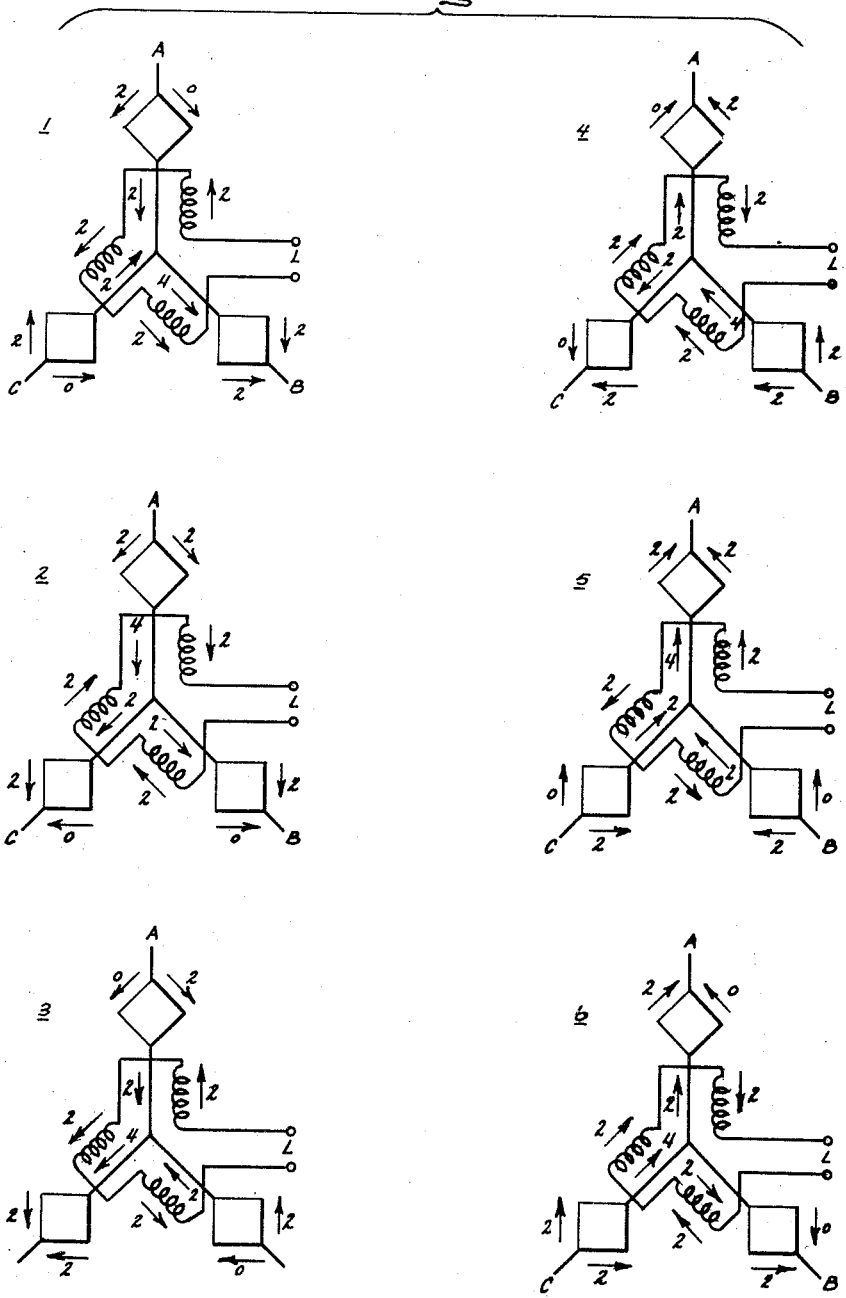

Figure 9 shows a series of diagrams depicting the idealized saturation curve for one of the output reactors of Figure 1, and indicating the magnitude and direction of magnetization during each of the 60 degree intervals of Figures 3 to 7; and Figure 10 shows a series of symbolic diagrams indicating the direction and magnitude of the currents flowing in the alternating current windings of the output and current limiting reactors of the system of Figure 1 with a unity power factor load drawing the maximum amount of current possible without causing use of the load current limiting characteristic of the system.

Figure 2:
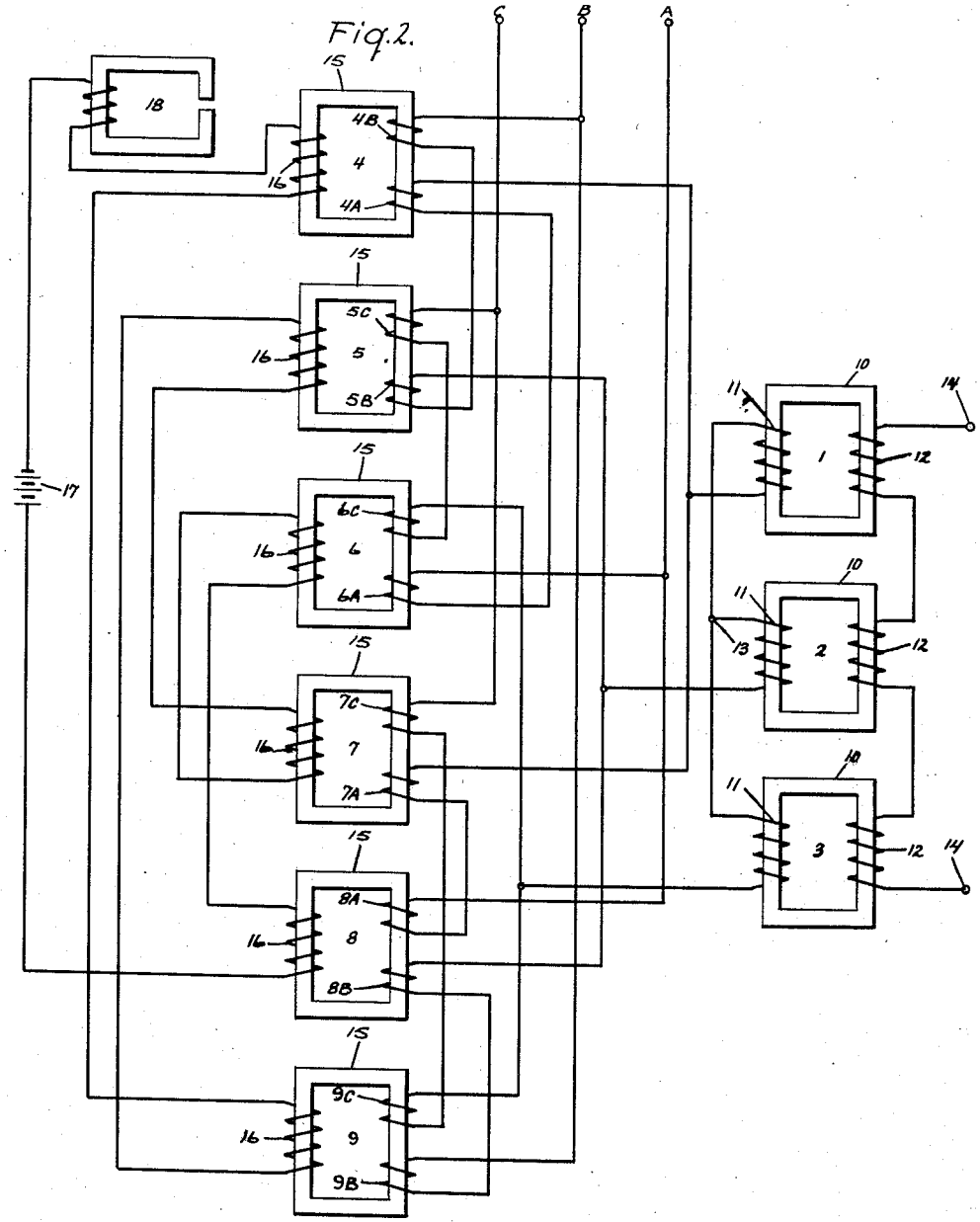
Figure 2 is a schematic diagram of the core and coil arrangement of the reactors.

Referring now to Figures 1 and 2 of the drawings, there are provided three output saturable core reactors 1, 2, and 3. Each output reactor has a core 10 with a primary winding 11 and a secondary winding 12 thereon. The primary windings 11 are connected together in a Y so that they are joined at a center point 13; the secondary windings 12 are all connected together in series across two output terminals 14.

Six current limiting reactors 4, 5, 6, 7, 8, and 9 are each provided with a core 15, a saturating bias winding 16 and a pair of alternating current windings. In the case of reactor 4 one alternating current winding 4A is in phase A and the other alternating current winding 4B is in phase B. Similarly reactor 5 has alternating current windings 5B and 5C, reactor 6 has alternating current windings 6A and 6C, reactor 7 has alternating current windings 7A and 7C, reactor 8 has alternating current windings 8A and 8B, and reactor 9 has alternating current windings 9B and 9C. As appears most clearly in Figure 1, the twelve alternating current windings of reactors 4 to 9 are divided into 3 groups of 4 windings each, with each of the 4 windings of any one group being provided from a different current limiting reactor. The windings of each group are connected in two parallel pairs, with each pair having two serially connected windings. Each group is connected in series with a primary winding of an output reactor. Thus, windings 6A and 4A form a first pair in series and windings 8A and 7A form a second pair in series; the two pairs are connected in parallel with each other, forming a group which is connected in series with input winding 11 of reactor 1. Windings 5B, 4B, 8B, and 9B similarly constitute a group connected in series with winding 11 of reactor 2, and windings 9C, 7C, 6C and 5C constitute a group connected in series with winding 11 of reactor 3.

All the bias windings 16 are serially connected with each other in a circuit which includes a source of direct current power 17 and a choke reactor 18 in series with the bias windings in order to suppress alternating currents in the direct current circuit. Each core 15 is so designed that the direct current through the winding 16 positioned thereon will cause core 15 to be saturated in a predetermined direction with respect to the two alternating current windings positioned on the same core. The direction of bias of the windings 16 with respect to their associated alternating current windings is shown by arrows in Figure 1. If, in the input three phase supply circuit, "positive" current is designated as current which flows toward the center 13 of the Y and "negative" is designated as current which flows away from the center 13 of the Y, it can be seen that in each case the flux generated by bias winding 16 of a current limiting reactor is assisted by flux generated by positive current in one of its alternating current windings and by negative current in the other. In other words, to use a specific example, positive current in winding 4A aids the bias winding 16 of reactor 4 in driving the core 15 thereof further into saturation, while negative current in winding 4B achieves the same end. The same relationship is present for the two alternating current windings of each of the other current limiting reactors 5 to 9.

Referring again to Figure 1 in particular, and to the arrows thereon, each pair of each group includes one alternating current winding wherein positive current aids its associated bias winding and another alternating current winding from a different reactor where negative current aids its associated bias winding. Thus, for instance, in winding 4A positive current aids in driving core 15 of reactor 4 further into saturation and in winding 6A of the same pair negative current is required to aid in driving core 15 of reactor 6 further into saturation. In the other pair of that group, winding 7A acts in the same manner as winding 4A and winding 8A acts like winding 6A.

Another relationship between the alternating current windings which is necessarily present is that the two reactors which have alternating current windings in one pair of a group have their other alternating current windings in different groups respectively. To use a specific illustration for this concept, windings 4A and 6A are in the same pair of the phase A group. Consequently, the other two windings of reactors 4 and 6, that is, windings 4B and 6C, are in different groups (phases B and C respectively in this instance). All the other pairs of alternating current windings of the current limiting reactors have been provided with the same relationship to each other as readily appears from an examination of Figure 1.

Reactors 1, 2, and 3 are of the sharply saturating type, and have their cores 10 designed so that they can be driven from saturation in one direction to saturation in the opposite direction during a 60 degree period of the impressed voltage. The ratio of the turns of the windings 11 and 12 of each of reactors 1, 2, and 3 is a matter of selection for the designer, with an output voltage higher than the input voltage being secured by providing a greater number of turns on windings 12 then on windings 11; however, best results are obtained where the voltage ratio between input and output windings is the same for all three reactors. It is assumed, for purposes of explanation, that windings 11 and 12 all have substantially equal turns.

The current limiting reactors 4 to 9 have their bias windings 16 arranged to provide the proper number of ampere turns to drive cores 15 well into saturation. Each of the two alternating current windings associated with each current limiting reactor is designed to pass enough current to provide the same number of ampere turns as the bias winding, but so that, where both alternating current windings of a reactor are receiving input current opposing the bias current under no-load conditions, the total of their ampere turns is equal to the ampere turns of the bias winding. This may be effected, for instance, by providing twice as many turns in each bias winding as in each alternating current winding. Thus, a maximum of twice the bias current can flow—opposing the bias—in one of the alternating current windings when current in the other alternating current winding of that reactor is zero. If equal currents, both opposing the bias current, flow in both alternating current windings the maximum current for each winding is equal to the bias current.

For best results, the voltage ratios of the alternating current windings to the bias windings of the current limiting reactors should all be the same. This can, obviously, most easily be achieved by making all the bias windings alike, all the alternating current windings alike, and all the cores alike.

The physical construction of the reactors does not constitute a part of the invention, except to the extent that it is necessary that each reactor be designed to go into saturation. However, one possible suggested construction is that shown in Figure 2 of a standard closed O-shaped magnetic core which is formed in the usual manner from a plurality of relatively thin laminations of magnetic material, with the windings thereof arranged on the core in close-coupled relationship.

In order to explain the operation of the circuit of Figures 1 and 2, reference will now be made to Figures 3 to 9 in addition to Figures 1 and 2. Each bias winding is assumed to have 2 N turns and each alternating current winding is assumed to have N turns; in this explanation, the bias current is defined as one unit of current. This means that a phase current of three units flowing in alternating current winding 11 of reactor 1 is three times the bias current flowing in bias windings 16 of reactors 4 to 9.

If one unit of bias current is flowing in the circuit of the direct current bias windings 16 of reactors 4 to 9 there will be produced two units of magnetomotive force in their respective cores 15. All of reactors 1 to 9 are designed so that their cores are driven well into saturation when two units of magnetomotive force are produced therein. Thus, the bias windings 16 are sufficient, without any other factor being considered, to induce saturation in their associated cores.

Let it now be assumed that the phase A voltage is approaching its maximum positive, that is, in interval 1 of Figure 3. At this instant, assuming that no load is connected across output terminals 14, core 10 of reactor 1 is out of saturation. Since input winding 11 of reactor 1 may be assumed to be pure inductance, the current flowing in input winding 11 of reactor 1 lags the phase A voltage by 90 degrees, i.e., it is at zero. The high unsaturated impedance of winding 11 of reactor 1 tends to hold the phase A current at zero during interval 1. With a substantial voltage drop across winding 11 (which will be further discussed below), reactor 1 becomes an ordinary transformer and produces an output voltage across terminals 14.

It is of course understood that all three phases A, B, and C have the same current wave form 120 degrees apart, just as they have the same voltage wave form 120 degrees apart as shown in Figure 3. During interval 1 when the voltage in phase B is approaching zero going positive, the current in phase B is at a negative maximum. Similarly, the voltage in phase C has passed through zero going negative, and the current in phase C is at a positive maximum. The maximum current which can pass through a phase under the no-load condition is three units as will be explained. Thus, as can best be seen in Diagram 1 of Figure 8, at the same time the current in phase A is zero the current in phase B is three units negative and the current in phase C is three units positive. The current path is, consequently, from the phase C terminal through the phase C circuit and through the phase B circuit to the phase B terminal.

The direct current bias is saturating cores 15 of reactors 7 and 5 in a negative direction insofar as windings 7C and 5C are concerned and cores 15 of reactors 9 and 6 in a positive direction with respect to windings 9C and 6C. The same relationship exists in the B phase, with cores 15 of reactors 4 and 9 being saturated negatively with respect to windings 4B and 9B and cores 15 of reactors 5 and 8 being saturated positively with respect to windings 5B and 8B. Since the current in phase C is positive, it can be seen that the current passing through windings 7C and 5C opposes the bias current of their associated windings 16 and that the current passing through windings 9C and 6C assists the current in their bias windings 16 thus driving their cores further into saturation. In phase B, where the current is negative, the current in windings 4B and 9B assists the bias current thus driving their respective cores further into saturation, while the current in windings 5B and 8B opposes the bias current of their respective associated bias windings 16.

In addition, reactors 1, 2, and 3 are designed in this particular case for purpose of illustration, with N turns in both windings. It can therefore be seen that the three units of current through windings 11 of reactors 3 and 2, whose cores have been saturated by previous voltage waves, hold these cores at three units of magnetization with the saturation being positive in the case of the core of reactor 3 and negative for the core of reactor 2.

Continuing to examine phases B and C during interval 1, it can be seen that reactors 7 and 8 each have one alternating current winding carrying current opposing the bias current and that reactor 5 has both of its alternating current windings arranged to carry current opposing the bias current. It will also be recalled that zero current is passing through phase A and that the maximum current opposing the bias which can pass through the two alternating windings of a reactor is two units. Therefore windings 8A and 7A carry no current and two units can pass through windings 8B and 7C. However, the two like windings 5B and 5C must have the two units of current and therefore each has only one unit passing through it. The total current is therefore three units. It splits as it comes in through phase C, with two units passing through windings 7C and 9C and one unit passing through windings 5C and 6C. As it passes out through phase B the current again splits, with one unit passing through windings 5B and 4B and two units passing through windings 8B and 9B. In this manner the cores 15 of reactors 5, 7, and 8 each have two units of magnetomotive force opposing the magnetomotive force from their direct current bias windings. This means that there is a net magnetomotive force of zero and that therefore reactors 5, 7, and 8 are out of saturation.

The relationships of all the windings except those of the current limiting group of phase A have now been completely set forth for interval 1. With zero current flowing in phase A, reactors 6 and 4 are both saturated as has been described in connection with phases B and C. The reactors 8 and 7 both have their cores 15 unsaturated as has also been explained. However, alternating current windings 7C and 8B parallel the identical windings 5C and 5B which have equal voltages across them, and therefore must also have equal applied voltages. It follows then that windings 7A and 8A, since they are on the same cores as windings 7C and 8B, will also have equal voltages across them. Windings 7A and 8A are connected in voltage bucking relationship so that the net induced voltage across the two is zero. At the same time, the series connection of 7A and 8A presents a low impedance because companion windings 7C and 8B are serially connected between lines C and B with only the saturated impedances of reactors 2, 3, and 9 interposed.

To summarize the foregoing, reactor 1 has its core unsaturated and reactors 2 and 3 have their cores saturated during interval 1 so that winding 12 of reactor 1 constitutes the output winding to provide a half cycle of alternating current voltage as shown in Figure 6. It can be seen that unsaturated reactor 5 spans the voltage across phases C and B since it has like windings on each side of point 13. Thus, reactor 5 establishes a mid-point between these two voltages for the mid-point 13 of the Y. Consequently, the voltage across winding 11 of reactor 1 is the voltage between phase A and the mid-point of the voltages of phases B and C. This is shown by the shaded portion in Figure 3 under interval 1. It can be seen that the half cycle of output voltage has a symmetrical form and a substantially greater magnitude than if the voltage across winding 11 of reactor 1 were merely the voltage of phase A to neutral. Windings 7C and 5C in phase C, and 5B and 8B in phase B are unsaturated and perform a current limiting function to prevent an effective short circuit across phases C and B. Also, the relationship of the alternating current windings in phases C and B provides low impedance paths through the alternating current windings connected in phase A.

At the end of interval 1 and start of interval 2, the phase A voltage is decreasing. At this point, the reactors are so designed that the volt-second capacity of reactor 1 has been exhausted by the voltage supported by winding 11, and reactor 1 passes into saturation. Referring to diagram 1 of Figure 9, it can be seen that during interval 1 the core 10 of reactor 1 came out of negative saturation, as represented by the dotted point on the negative horizontal part of the saturation curve, passed through unsaturation, and back into positive saturation as shown by the point at the right of the diagram on the positive horizontal portion of the saturation curve. When reactor 1 passes back into saturation, the current through phase A increases rapidly to three units positive, as shown in Figure 4.

As reactor 1 passes back into saturation, reactor 3 comes out of saturation and the current in phase C decreases rapidly to zero. Reactor 3 therefore serves as the new output transformer and supplies a half cycle of output voltage across terminals 14 during the 60 degrees of input voltage during which the reactor 3 remains out of saturation. The current in phase A quickly rises to its maximum of three units with the saturation of reactor 1, while the current in phase B continues substantially at a negative value of three units so that the core of reactor 2 remains saturated. Therefore, following the same rationale applied to interval 1, the currents in the system during interval 2 are as shown in diagram 2 of Figure 8. Also, the voltage across reactor 3 during this interval will be the voltage between phase C and the mid-point of phases A and B. This results from the fact that the alternating current windings carrying current opposing the bias current are now 6A, 8A, 5B and 8B. Consequently, reactor 8 (with like windings 8A and 8B) now spans the line voltage A to B and establishes the mid-point between these voltages at point 13. In the same manner as before, one unit of current passes through each of windings 8A and 8B driving the core 15 of reactor 8 out of saturation, and two units pass through each of windings 6A and 5A driving the cores 15 of reactors 6 and 5 out of saturation to effect a current limiting function. In the current limiting group of phase C, the reactors 7 and 9 are in saturation providing low impedance. The reactor windings 5C and 6C have the same voltages applied across them as windings 5B and 6A; these are identical and in bucking relationship, and a low impedance path is provided through them.

During interval 2, to summarize, output winding 12 of reactor 3 provides a half cycle of negative output voltage as shown in Figure 6, with the voltage across winding 11 of reactor 3 being the voltage from phase C to the mid-point of phases A and B. Reactors 5, 6, and 8 are out of saturation and act to limit the current across phases A and B and prevent a short circuit. Reference to Figure 9, which shows the saturation curve for core 10 of reactor 1, shows that the current flowing in phase A maintains core 10 in positive saturation.

The operation of the system of Figure 1 during one complete cycle of applied voltage with no load connected across output terminals 14 can now be determined in the same manner as for intervals 1 and 2. The units of phase current flowing in each of the phases during any of the six intervals of Figure 3 can be determined from Figure 8 which shows the magnitude and polarity of the current flowing in the various parts of the system. The phase current of phases B and C during any interval is determined by observing the position of the phase voltage wave with respect to the phase A voltage wave and assuming the same relative positions for the current wave with respect to the phase A current wave.

Applying these teachings to determine what happens during interval 3, reactor 3 becomes saturated; also, the current in phase B rapidly decreases to zero as output reactor 2 comes out of saturation and acts as an output transformer to provide a half cycle of symmetrical voltage wave across output terminals 14. Reactors 6, 8, and 9 have their cores out of saturation to provide a current limiting effect, with the two alternating current windings 6A and 6C spanning the voltage across A and C so as to provide a voltage at point 13 half-way between the A and C voltages. It will be observed that there is still positive current flowing through reactor 1 and that therefore core 10 of the reactor is maintained in positive saturation as shown by diagram 3 of Figure 9.

At the end of the third interval reactor 2 is saturated by the applied A.-C. voltage. At the same time the core of reactor 1 comes out of saturation and the current passing through phase A decreases to zero. Diagram 4 of Figure 9 shows that the direction of saturation is opposite to that of interval 1, so that the voltage wave output from reactor 1 across terminals 14 is of an opposite polarity to that which it provided during interval 1. This then completes the second full cycle of output voltage, with 240 degrees of the input voltage cycle having elapsed. In this case the current in the system is going from phase B to phase C, with the voltage across winding 11 of reactor 1 being of the same magnitude as before, i.e., the voltage between A and the mid-point of phases B and C. Since the currents of phases B and C are in the opposite directions to those of the same currents during interval 1, reactor 9 is the one which spans phases B and C, and reactors 4, 6, and 9 perform the current limiting function.

As the end of interval 4 is approached, reactor 1 goes back into saturation at the same time that the current in phase C goes to zero. Reference to Figure 9 (diagrams 4 and 5) shows that as the time passes from interval 4 to interval 5 reactor 1 goes back into saturation in the opposite sense to its saturation before interval 4 and remains there during interval 5.

The functioning of the system during the remainder of a full cycle of input voltage is in accordance with the principles described; the output reactor for each interval, the output voltage across the reactor, and the current limiting reactors are shown for the six intervals of a full input cycle in the chart of Figure 5.

It can be seen from the foregoing description that the static magnetic frequency tripler of the invention provides single phase output voltage at three times the frequency of the three phase input power. In addition, each half cycle of output voltage is highly symmetrical since it has a dome-like shape with the peak of the dome occurring mid-way through the half cycle. Further, the output voltage is markedly higher than would be obtained if the voltage across the winding 11 of the reactor supplying the output were merely the voltage of that phase to ground.

When a unity power factor load, such as a resistive load, is connected across output terminals 14, load current flows in windings 12 of reactors 1, 2, and 3. Referring now to Figure 10, the current distribution with a unity power factor load drawing two units of current will be described. With two units of current passing through the output windings 12 during the first interval, a positive current of two units is induced in the primary winding 11 of reactor 1 which, as has been explained, provides the output during interval 1. It will be recalled that the current during interval 1 is passing from phase C to phase B. Consequently, the currents in phases C and B must be adjusted to accommodate the two units of current now flowing in phase A. The maximum amount of current that can be passed through phase B is four units since each leg of each current limiting group is designed to permit a maximum of two units of current to pass. With two units of current positive in phase A, the negative current in phase B increases to its maximum of four; phase C must then have two units of positive current therein so as to balance the system.

In phase B, each of the two pairs of alternating current windings has the maximum two units of current passing therethrough, as previously stated. The current in windings 8B and 5B opposes the bias of those reactors and brings their cores out of saturation. Consequently, since reactor 8 is unsaturated, no current passes through winding 8A. The negative current in phase B is sufficient to desaturate reactor 5, and so no current flows in winding 5C of that reactor. Consequently, the two units of current flowing in phase C all pass through windings 7C and 9C and in phase A the two units of current all pass through windings 6A and 4A.

Thus, during interval 1, the system will function up to a load current of two units as intended and as explained in connection with the no load arrangement. The only difference arises in the current distribution throughout the system, as shown by a comparison of diagrams 1 of Figures 8 and 10 respectively, and by the Figure 4 which shows in solid lines the phase A current under no load conditions and in dotted outline the phase A current under unity power factor load conditions.

Should the load current tend to exceed two units, reference to diagram 1 of Figure 10 shows that the core 10 of reactor 3 will come out of saturation so that both reactors 1 and 3 are out of saturation and supplying output voltage. Inasmuch as the voltages in phases A and C are subtractive with respect to each other, the load current is inherently limited since any tendency of the load current to increase past the limit of two units will result in a decrease in the output voltage.

Figure 8:
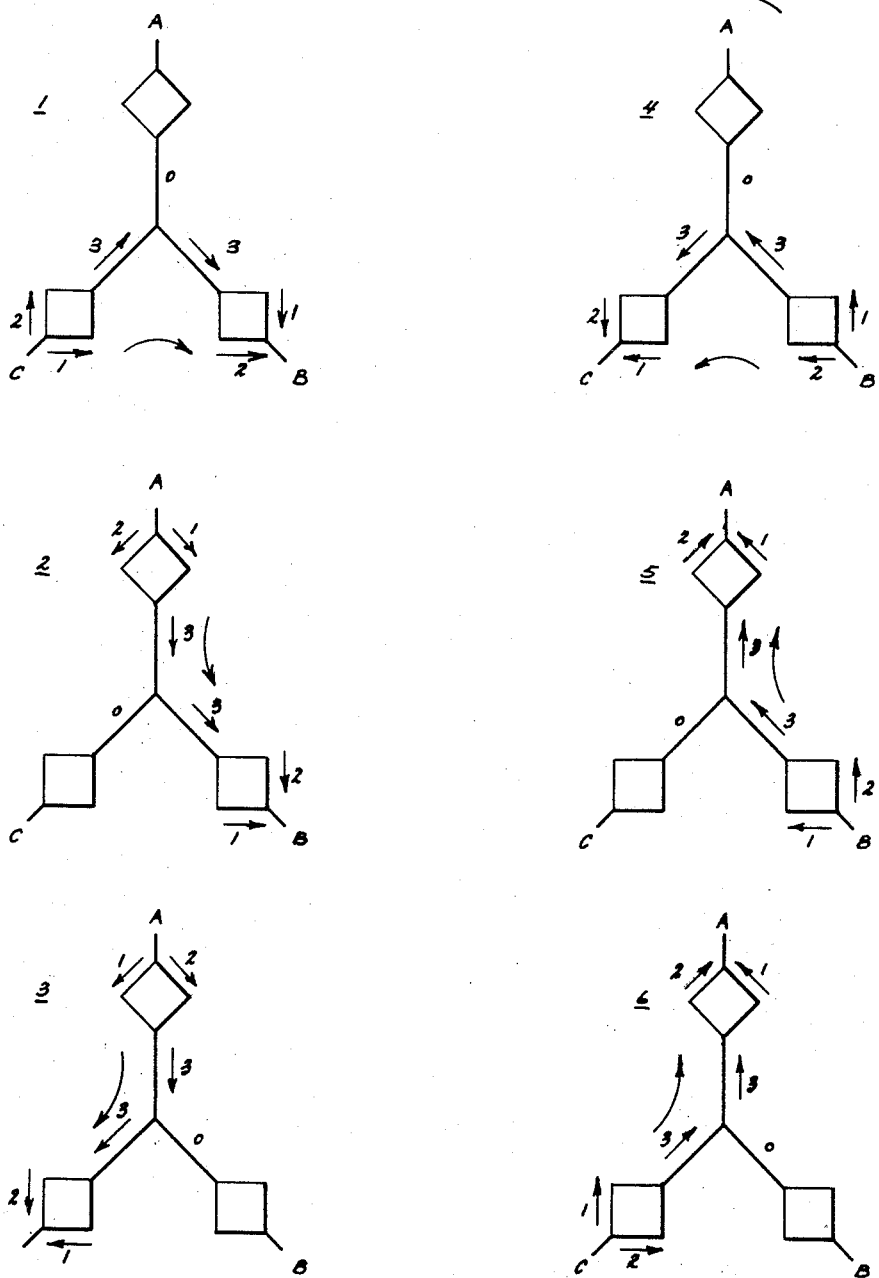
Figure 8 shows a series of symbolic diagrams indicating the direction and magnitude of the currents flowing in the alternating current windings of the output and current limiting reactors of the system of Figure 1 during each of the 60 degree intervals of Figures 3 to 7 under a no load condition.

At the end of interval 1, the core of reactor 1 goes back into saturation, just as in the case of the no load condition, and reactor 3 in phase C becomes the output reactor. With the two units of load current now flowing in the opposite direction since the next half cycle of output current has arrived, a negative current of two units flows in phase C. Since, as shown in Figure 8, diagram 2, the current flow is from A to B, the current through phase A must be increased in order to supply the two units of current flowing through phase C. Consequently, the current in phase A rises to its maximum of four units, with two units of current flowing through each of the parallel paths of the current limiting group. The current flowing in phase B is then two units negative to balance the currents in the system. Figuring the division in the parallel paths in the same manner as for interval 1, the phase A current splits evenly, with two units going through windings 6A and 4A and two units going through windings 8A and 7A. In phase C the two units will flow through the windings 9C and 7C of saturated reactors 9 and 7 while in phase B the two units of current will flow through windings 5B and 4B. Any tendency for the load current to increase past two units will cause reactor 2 to come out of saturation thereby providing two output reactors 2 and 3 providing subtractive output voltages across terminals 14.

The current distribution throughout the system and the load limit reactors for the remaining four half-cycles may be readily determined by reference to the diagrams of Figure 10 and to Figure 5.

It can be seen from the foregoing that in addition to providing a single phase output frequency three times that of the three phase input frequency, the system is inherently load current limiting and cannot permit the load current to attain destructive proportions.

The above discussion has assumed ideal core materials for the output reactors 1, 2, and 3, that is, it has been assumed that the saturation curves have square knees and flat post-saturation branches. Actually, however, it will be understood that all known magnetic materials have some slope to the post-saturation branches of their saturation curves, and the saturated inductance of the reactor is proportional to this slope. Since, with the system described, the output current must be delivered to the load through two nominally saturated output reactors in series, the equivalent circuit of the output reactors may be represented by the voltage of the unsaturated effective output reactor in series with the saturated impedance of the other two output reactors. This saturated impedance is primarily inductive and non-linear because the saturation curve is non-linear. A leading current through this inductive impedance results in a voltage in phase additive to the voltage of the effective reactor; it is well known that a transformer having internal leakage inductance and supplying a leading current load has a terminal voltage higher than its open circuit voltage. The terminal voltage of the tripler of this invention with a capacitive load may therefore be higher than the no load terminal voltage. Conversely, in the case of an inductive load, the internal regulation of the tripler is poorer. For this reason in an actual device, a slightly capacitive load may be desirable.

A circuit according to Figures 1 and 2 has been constructed and tested. Because of the availability of output reactors having half the voltage rating required, two reactors were connected in series to serve as a single output reactor in each case (primaries connected in series, secondaries connected in series). Three such pairs constituted three output reactors, 1, 2, and 3. The six reactors so connected were identical, each having a core formed of grain oriented silicon steel having a moderately sharp saturating characteristic. These cores were 8 inches long by 3¼ inches wide with a stack height of 1⅛ inches and with their legs having a width of 1 inch and the ends having a width of 2 inches. The primary windings of each of these six reactors were made up of two coils connected in parallel, each having 129 turns of .0763 inch diameter wire and the secondary or output windings of each of these six reactors were made up of two coils connected in series, each having 208 turns of .0427 inch diameter wire. The current limiting reactors 4 to 9 were also identical, each having its core formed of grain oriented silicon steel having a moderately sharp saturating characteristic. Each of the cores 15 of the current limiting reactors was 3¼ inches wide and 8 inches long with a stack height of 1¼₆ inches and with the leg being 1 inch wide and the ends having a width of 2 inches. The bias winding 16 consisted of two coils connected in series, each having 274 turns of .0403 inch diameter wire, and each of the two alternating current windings of each current limiting reactor had 82 turns of .0808 inch diameter wire. Choke reactor 18 was designed for an inductance of .91 henry at 1.6 amperes direct current. In the circuit tested, with the system being provided with three phase alternating current of 220 volts at 60 cycles, a no-load output voltage of 780 volts at 180 cycles was provided across terminals 14 with 2 amperes of bias current. The system was found to provide load current up to 3 amperes at 600 volts to a unity power factor load, and 3.75 amperes on short circuit. In addition, the system was found to have an actual rating factor of 4.7 when a capacitor (8.2 micro-farads) was connected in series with the load. This rating factor is a marked improvement over the rating factors of other previously used static triplers.

While the invention has been explained by describing a particular embodiment thereof, it will be apparent that improvements and modifications may be made without departing from the scope of the invention as defined in the appended claims.

What I claim as new and desire to secure by Letters Patent of the United States is:

1. A static frequency tripler for converting three phase alternating current having a predetermined frequency into single phase alternating current having a frequency three times said predetermined frequency comprising: three output saturable core reactors each having primary and secondary windings, said primary windings being connected in a Y, said secondary windings being connected in series and being adapted to be connected across a load; and six current limiting saturable core reactors each having a bias winding and two alternating current windings; said twelve alternating current windings being divided into three groups each having four alternating current windings from four different current limiting reactors respectively, each said group having said four windings thereof connected in two parallel pairs each having two serially connected windings, said three groups being connected in series with said three primary windings respectively whereby each group is in a leg of said Y and each current limiting reactor has its alternating current windings in different legs of said Y, each of said bias windings being adapted to have a bias voltage impressed thereacross, each of said current limiting reactors being wound so that said bias winding thereof is aided by positive current in the first alternating current winding thereof and by negative current in the second alternating current winding thereof, each of said pairs of each of said groups including said first alternating current winding of one current limiting reactor and said second alternating current winding of another current limiting reactor, the two of said current limiting reactors which have alternating current windings in one of said pairs of a group having their other alternating current windings in different groups respectively.

2. The tripler of claim 1 in which each of said output reactors has core means constructed to be driven from saturation in one direction to saturation in the opposite direction in 60 degrees of a cycle of the alternating current voltage impressed on its primary winding.

3. The tripler of claim 1 wherein each of said output reactors has core means arranged to be driven from saturation in one direction to saturation in the opposite direction in 60 degrees of a cycle of the alternating current voltage impressed on its primary winding, and wherein the voltage ratio of the bias winding of one of said current limiting reactors to the alternating current windings thereof is the same as that of each other current limiting reactor.

4. The tripler of claim 1 wherein each of said output reactors has core means arranged to be driven from saturation in one direction to saturation in the opposite direction in 60 degrees of a cycle of the alternating current voltage impressed on its primary winding, and wherein all said alternating current windings of said current limiting reactors have an equal number of turns, and all said bias windings have an equal number of turns.

References Cited in the file of this patent

UNITED STATES PATENTS

| | | |
|---|---|---|
| 1,157,730 | Spinelli | Oct. 26, 1915 |
| 2,727,159 | Sunderlin | Dec. 13, 1955 |
| 2,820,942 | Depenbrock | Jan. 21, 1958 |

OTHER REFERENCES

"Magnetic Frequency Multiplier for Phorescent Lighting" (Downie), Electronics, May 1955, pages 224–230.